United States Patent

[11] 3,588,083

| [72] | Inventor | Joseph R. Callanan |
| | | Whitman, Mass. |
| [21] | Appl. No. | 759,032 |
| [22] | Filed | Sept. 11, 1968 |
| [45] | Patented | June 28, 1971 |
| [73] | Assignee | Cal-Tav, Inc. |
| | | Cambridge, Mass. |

[54] JIG FOR MOUNTING ELECTRICAL OUTLET BOXES
10 Claims, 3 Drawing Figs.

[52] U.S. Cl. ............................................. 269/98,
220/3.6, 248/27, 24/73(b)
[51] Int. Cl. ............................................. B25b 5/14,
B25b 11/02
[50] Field of Search ............................................. 269/98, 95,
77, 50, 254, 321 (S); 220/3.6, 3.9, 3.9-2; 248/27
(O.B. Digest); 33/(O.B. Digest), 180 (A); 24/73
(b), 81, 81 (b), 81 (FC), 81 (PH), 261, 261 (CS),
261 (CF), 261 (WL); 211/45

[56] References Cited
UNITED STATES PATENTS

| 2,565,636 | 8/1951 | Tinnerman ................... | 24/81BUX |
| 2,751,106 | 6/1956 | Schrader ...................... | 24/81BUX |
| 3,434,686 | 3/1969 | Aoi ............................... | 211/45X |

FOREIGN PATENTS

| 1,191,541 | 4/1965 | Germany ...................... | 24/73(B) |
| 571,085 | 1957 | Italy ............................. | 24/81(B) |

Primary Examiner—Andrew R. Juhasz
Assistant Examiner—Donald D. Evenson
Attorney—Curtis, Morris & Safford ABSTRACT: A jig for mounting electrical outlet boxes to building wall members having a three-sided open loop section adapted to grasp a wall of an outlet box, an arm extending from the loop section to align the box and jig on a building wall member, and a leg member extending from the arm to hold the jig and box on the building wall member.

PATENTED JUN 28 1971 3,588,083

INVENTOR
JOSEPH R. CALLANAN

BY Curtis, Morris & Safford
ATTORNEYS

JIG FOR MOUNTING ELECTRICAL OUTLET BOXES

This invention relates to a device for mounting electrical outlet boxes, and more particularly to a sturdy, inexpensive, one-piece reusable jig that quickly and easily can be slipped onto an electrical outlet box with which it can be mounted on a stud of a building under construction to align the box accurately for securing the box to the stud, and then readily can be removed from the box and stud.

Outlet boxes ordinarily are mounted in new buildings, for example houses, on wall studs over which a lath and plaster or a dry-wall construction is placed to form the interior walls. The open end of the box, into which later is placed a receptacle or switch, must extend outwardly from the stud an amount about equal to the wall thickness so that the exposed portion of the box will be flush with the wall. Also, the box must be aligned vertically so its top and bottom project an equal distance from the front face of the stud.

Hand mounting of electrical boxes is difficult and time consuming because at least one hand must be used to hold the box as it is secured, e.g., by nails, to the stud. The box often slips, or inadvertently is moved by the worker's hand, and is misaligned. A house might have as many as 20 or more electrical outlets, so that the time involved properly to hand mount the outlet boxes, and to remount misaligned ones, is considerable.

Numerous devices have been created to align or to hold and align electrical outlet boxes as they are secured to studs. Many such devices have been patented, for example, in U.S. Pats. No. 2,802,634, No. 2,990,172 and No. 3,154,304. In general, however, the previous devices have serious shortcomings. Some are permanently affixed to the box or stud, and thus are not reusable. Others are of relatively complex construction, having a multiplicity of parts some of which are movable, and thus are both expensive to make and very subject to wear and breakage.

It is an object of this invention to provide an improved jig for mounting electrical outlet boxes. Another object of this invention is to provide an outlet box mounting jig that is readily attached to the box, simple to place on a stud, accurately and positively aligns and holds the box against the stud, and is easily removed from both the box and stud for reuse, all in a comparatively short amount of time. A further object of this invention is to provide a jig of the type described that has a relatively simple design and unitary construction, without a multiplicity of parts, particularly moving parts. These and other objects of this invention will be in part discussed in, and in part apparent from, the following more detailed disclosure.

The present invention can be understood more thoroughly by reference to the accompanying drawing, in which.

Figure 1:
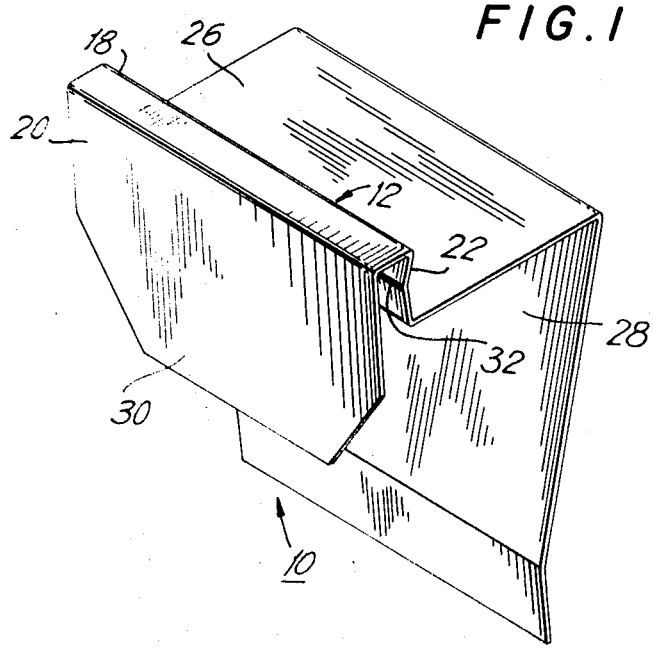
FIG. 1 is a perspective and shows an embodiment of an electrical outlet box mounting jig according to this invention.

Broadly, a jig 10 according to this invention has an open loop section 12 that is adapted to extend over and embrace an edge 14 of one sidewall 16 of an electrical outlet box 15 (partially shown in the drawing). The open loop 12 of the jig 10 is pressed over the wall edge 16 until the closed end 18 of the loop is uniformly against the edge 14. The sides 20,22 of the open loop 12 press against the sides of the wall 16 and firmly hold the box 15. The loop 12 fits over the wall edge 14 an amount X equal to the distance the outlet box 15 is to project out from the face 24b of a stud 24, i.e., the thickness of the interior wall construction to be placed on the stud.

Extending from one side 22 of the open loop section 12 is an alignment arm 26. The plane of the arm is substantially parallel to the plane of the closed end 18 of the loop 12. To align a box 15 on a stud, the box is placed against one side 24a of the stud 24 and the alignment arm. If the jig is pushed flush against the outer face 24b of the stud. Thus the periphery 14,14a of the open end of the box uniformly projects the desired distance X beyond the stud, and the box is accurately and positively aligned for mounting.

To hold an aligned box 15 against a stud 24 during mounting, a leg member 28 extends from the arm 26 at the end thereof opposite the open loop 12. The leg member 28 serves to apply pressure against the side 24c of the stud opposite the sidewall 16 of the box 15, and thus, in effect, to clamp the box 15 and jig 10 to the stud. Mounted in that fashion, the outlet box can be fastened to the stud without having to hold the box by hand.

For ease of placing the open loop section 12 over the sidewall edge 14 of the box 15, a tab section 30 optionally extends from the sidewall 20 of the loop 12 opposite the arm 26. The tab section 30 also serves to prevent any tendency of the box 15 to rotate, in the loop 12, away from the stud 24, and thus is a desirable feature of the instant jigs.

Figure 2:
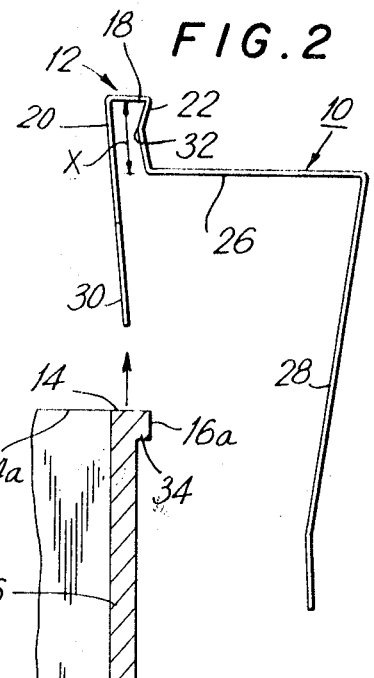
FIG. 2 is a section and shows the jig of FIG. 1 and its relation to an outlet box.
Figure 3:
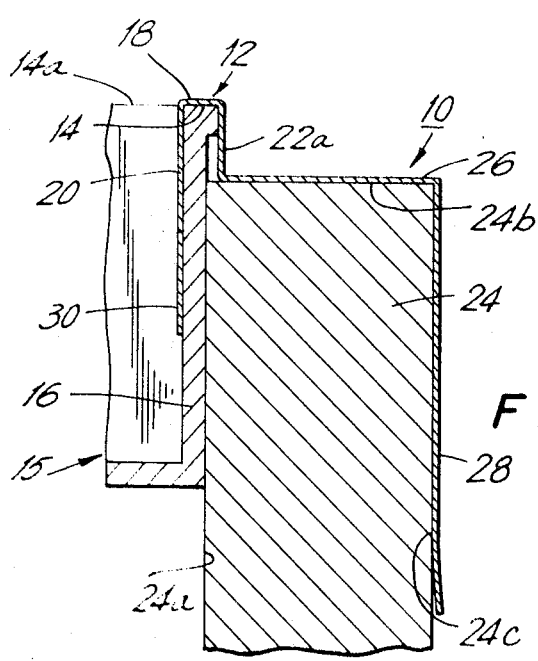
FIG. 3 is a section and shows an outlet box mounted and aligned on a stud by a jig of the invention.

FIG. 2 illustrates the profile of a jig 10, without a box and stud, in what can be called an undistended condition. One end of the sidewall 22 of the open loop 12 tends to close in toward the other sidewall 20. Inasmuch as the jig 10 is made of a resiliently flexible material, for example, a spring steel or a synthetic plastic having similar properties, the sidewalls 20,22 of the loop can be spread apart to receive the edge 14 of the box wall 16 and, in that operative condition, exert a pressure against the box wall to hold the box 15 firmly. Similarly, the leg member 28 is substantially in a plane somewhat at less than a right angle to the alignment arm 26, and tends to close toward the loop 12. Thus it can be spread outwardly for positioning on a stud 24 against which it exerts a pressure to hold the jig 10 and the box 15 firmly until the box is fastened. Thereafter the jig is quickly and easily removed by grasping the loop 12 and pulling the jig off both the stud and box.

A feature of a preferred embodiment of the invention also is illustrated in the drawing. The sidewall 22 of the open loop section 12 attached to the arm section 26, and adapted to bear against the exterior face 16a of the wall 16 of an outlet box, has at the end adjacent the arm 26 a portion 22a turned away from the opposite wall 20 of the loop. The line of the turn, or end 32, in the wall corresponds to a lip 34 around the periphery 14,14a of the opening of many outlet boxes. The lip 34 reinforces the opening, especially of boxes made of relatively brittle material, such as Bakelite. As the loop 12 is passed over the edge 14 of the box 15, and the line of the turn 32 in the sidewall 22 passes beyond the lip 34, the box tends to snap into place in the loop. The snapping movement usually is accompanied by a distinct sound, often a musical sound if the jig is made of a metal such as steel. The snap movement and the sound signal positively that the box 15 is firmly and properly mounted in the jig 10.

It is of course to be understood that numerous changes can be made in the design and structure of the jigs of this invention without departing from the scope of the invention as disclosed herein before and as defined in the following claims.

I claim:

1. A jig for mounting electrical outlet boxes which comprises: an open loop section having a closed end, a first sidewall extending from one side of said closed end, and a second sidewall extending from the opposite side of said closed end in the same direction as and toward said first sidewall, said open loop being adapted to fit over an edge of and to bear firmly against a sidewall of an electrical outlet box to hold said box in said jig; an alignment arm extending substantially perpendicularly outward from said second sidewall of said open loop section and being adapted to bear against the face of a building wall member to which said outlet box is to be fastened; and a leg member extending from said alignment arm a relatively greater distance from said closed end than and in the direction of said second sidewall of said open loop section and toward said section, said leg member being adapted to bear firmly against said building wall member on the side thereof opposite an outlet box mounted in said jig and to hold said jig and said box onto said wall member.

2. A jig for mounting electrical outlet boxes according to claim 1 wherein said open loop section, said alignment arm and said leg member are a single piece of a flexible resilient material bent to form said section, arm and member.

3. A jig for mounting electrical outlet boxes according to claim 2 wherein said flexible resilient material is a metal.

4. A jig for mounting electrical outlet boxes according to claim 2 wherein said flexible resilient material is steel.

5. A jig for mounting electrical outlet boxes according to claim 1 wherein said second sidewall of said open loop section extends from the closed end thereof an amount substantially equal to a predetermined distance said outlet box is to project out from said building wall member, and said alignment arm extends from adjacent the end of said second sidewall.

6. A jig for mounting electrical outlet boxes according to claim 1 wherein said first sidewall of said open loop section extends a greater distance from said closed end than said second sidewall of said open loop section.

7. A jig for mounting electrical outlet boxes according to claim 1 wherein said leg member, in an undistended condition, is at less than a right angle to said alignment arm.

8. A jig for mounting electrical outlet boxes according to claim 1 wherein a first portion of said second sidewall of said open loop section is, in an undistended condition, at less than a right angle to said closed end of said loop, and a second portion of said second sidewall is at an angle to said first portion away from said first sidewall.

9. A jig for mounting electrical outlet boxes according to claim 1 wherein said building wall member is a stud.

10. A jig for mounting electrical outlet boxes which comprises: an open loop section having a closed end, a first sidewall extending from one side of said closed end, and a second sidewall extending from the opposite side of said closed end, said second sidewall having a first portion that extends in an undistended condition at less than a right angle to said closed end of said loop and having a second portion at an angle to said first portion away from said first sidewall, said open loop being adapted to fit over an edge of and to bear firmly against a sidewall of an electrical outlet box to hold said box in said jig; an alignment arm extending substantially perpendicularly outward from one of said sidewalls of said open loop section and being adapted to bear against the face of a building wall member to which said outlet box is to be fastened; and a leg member extending from said alignment arm in the direction of the open end of said open loop section, said leg member being adapted to bear firmly against said building wall member on the side thereof opposite an outlet box mounted in said jig and to hold said jig and said box onto said wall member.